J. M. ALLEN.
CENTRIFUGAL CASTING MACHINE.
APPLICATION FILED FEB. 17, 1910.
971,957.
Patented Oct. 4, 1910.
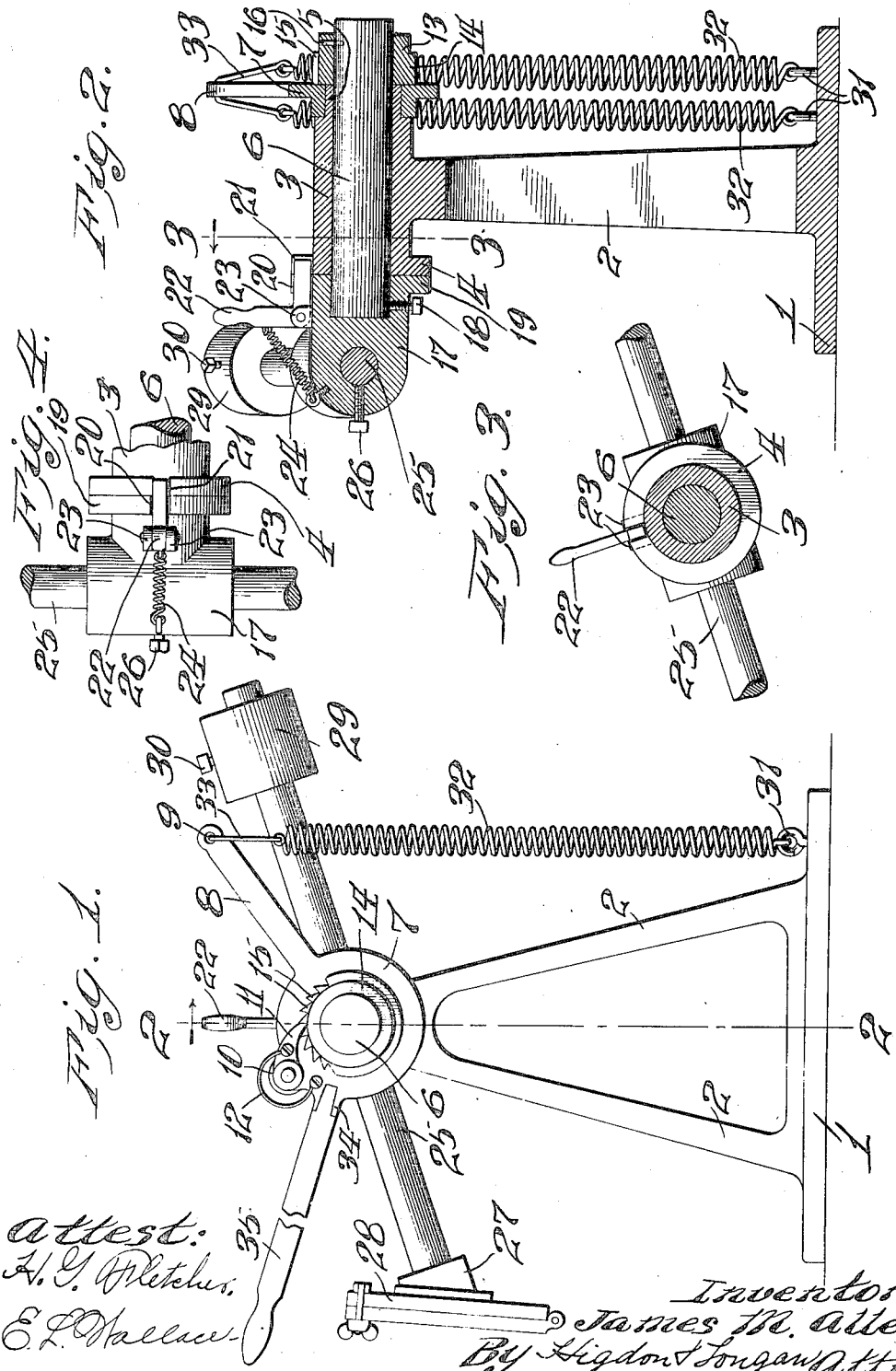
Attest:
H. G. Fletcher
E. L. Wallace
Inventor:
James M. Allen.
By Higdon & Longan Attys.

UNITED STATES PATENT OFFICE.

JAMES M. ALLEN, OF ST. LOUIS, MISSOURI, ASSIGNOR TO MARTIN FELLHAUER, OF ST. LOUIS, MISSOURI.

CENTRIFUGAL CASTING-MACHINE.

971,957.  Specification of Letters Patent.  Patented Oct. 4, 1910.

Application filed February 17, 1910. Serial No. 544,505.

*To all whom it may concern:*

Be it known that I, JAMES M. ALLEN, a citizen of the United States, and resident of St. Louis, Missouri, have invented certain new and useful Improvements in Centrifugal Casting-Machines, of which the following is a specification containing a full, clear, and exact description, reference being had to the accompanying drawings, forming a part hereof.

My invention relates to improvements in centrifugal casting machines, the object of my invention being to construct a machine of this class whereby the operation of setting the machine to store power in the driving spring is accomplished with a minimum of effort and in a minimum of time.

A further object is to construct a machine of this class in which the initial rotation of the machine is at a maximum speed as required to take advantage of the fluidity of the metal employed in making the casting.

For the above purposes my invention consists in certain novel features of construction and arrangement of parts as will be hereinafter more fully described, pointed out in the claims and illustrated by the accompanying drawing, in which:

Figure 1 is an end elevation of the complete machine; Fig. 2 is a vertical, sectional elevation of the machine taken on the line 2—2 of Fig. 1; Fig. 3 is a detail, sectional elevation taken on the line 3—3 of Fig. 2; and Fig. 4 is a detail, plan illustrating the connection between the flask and counterbalancing weight-carrying arm and the machine proper.

1 designates the base section of the machine frame, 2 the integral standards and 3 the journal bearing supported upon the standards and preferably formed integral therewith. The journal bearing 3 is provided at one of its ends with an integral, annular flange 4 and at the end of the bearing 3 opposed to the end carrying the flange 4 there is an annular reduction 5. Mounted for rotation within the bearing 3 is a shaft 6 which is of greater length than the bearing and projects beyond the bearing at each of its ends. Embracing the annular reduction 5 is a collar 7, and carried by the collar, preferably formed integral therewith, is an arm 8 the outer free end of which is perforated at 9. The collar 7 is provided with an integral, perforated ear 10 extending beyond the periphery of the collar, and pivotally carried by the ear 10 is a pawl 11.

12 designates a spring connecting the pawl 11 and collar 7 and is arranged to normally hold the pawl upwardly.

Embracing the shaft 6 and impinging against the journal bearing 3 and collar 7 is a retaining collar 13 which is provided with an integral flange 14 in which is formed a series of teeth 15, the collar 13 being secured to the shaft and rotatable therewith by means of the pin 16. Carried by the shaft 6 at its end opposed to the end carrying the collar 13 is a T-coupling 17 which is secured to the shaft 6 by means of the set screw 18. Formed upon the end of the branch of the T-coupling paralleling the journal bearing 3 is an annular flange 19. The flange 19 of the T-coupling 17 and the flange 4, formed integral with the journal bearing 3, are provided respectively with slots 20 and 21.

22 designates a bell crank lever which is pivotally mounted in perforated ears 23 formed integral with the T-coupling 17. One end portion of the lever 22 is designed to enter the slots 20 and 21 for the purpose of locking the T-coupling to the journal bearing for purposes hereinafter made clear. 24 designates a contractile coil spring arranged to normally hold the bell crank lever 22 out of engagement with said slots.

Carried by the T-coupling 17 is an arm 25 which is locked against movement longitudinally of the T-coupling by means of the set screw 26.

27 designates a head carried by one end portion of the arm 25 which is arranged to receive and hold a flask 28.

On the end of the arm 25, opposed to the end carrying the flask, is provided a weight 29 which may be moved longitudinally of the arm and secured against movement by means of the set screw 30. The weight 29 is provided for the purpose of counterbalancing the weight of the flask.

Secured to the base 1 and arranged on the side thereof beneath the right hand end of the shaft 6 is a pair of hooks 31 and connected therewith are the contractile coil springs 32. The opposite ends of the springs are connected with a hanger 33 which is inserted through the perforation 9 of the lever 8.

The collar 7 is provided with an extension 11°

34 arranged to receive a lever 35, the end of which is reduced where it unites with the extension 34.

In the practical operation of the machine, the parts are assembled as shown, and by reason of the construction of the locking devices, the springs 32 are normally in a contracted condition. If it is desired then to make a casting, the flask is put in proper condition in the ordinary manner and the weight 29 is positioned to counterbalance the prepared flask. The lever 35 is then placed in position and manually operated, thereby moving the lever 8 and storing power in the springs 32. The pawl 11 is then manually moved against the tension of the spring 12 to a position engaging the ratchet teeth 15 and at the same time the bell crank lever 22 is brought to a position within the slots 20 and 21. As the operator releases the lever 35 the locking devices, that is the pawl 11 and bell crank lever 22, will be held in locking positions frictionally, that is they are held against the ratchet teeth and said slots by the pressure of the springs 32. After the machine has been thus set the lever 35 is removed. The flask is then filled with molten metal and immediately after the filling of the flask the operator moves the lever 22 out of engagement with the slots 20 and 21, then, by reason of the power stored in the springs 32, and by reason of the springs being connected to an arm some considerable distance from the center of the bearing shaft of the machine, motion is imparted to the shaft from the force of said springs through the pawl and ratchet connection and the flask is rapidly rotated and the centrifugal force imparted to the molten metal within the flask suffices to drive the metal into the mold and to conform it to all surfaces and angles within the mold, thereby dispelling any air, gas, steam or other force opposing the entrance of metal to the mold and displacing such air, gas or steam with the metal carried by the sprue or riser thereby forming a true casting.

To persons familiar with the art it is known that the molten metal supplied to the flask will rapidly congeal and harden by exposure. Thus, it is obvious that it is necessary that the centrifugal force be applied as soon after the pouring as possible and that the centrifugal force is solely dependent upon the speed of rotation of the flask.

It is obvious that by reason of my attaching my driving springs to a lever and connecting the lever with the driving shaft the springs will exert a maximum speed to the shaft, thereby applying the maximum centrifugal force to the metal during the time of its maximum fluidity.

I am aware that prior to my invention there have been spring operated centrifugal casting machines. These machines were usually constructed with a helical spring secured at one end directly to the driving shaft thereby not obtaining a maximum speed upon the initial rotation of the shaft for the reason that the spring must necessarily, partially unwind before the maximum speed is obtained.

By reason of the construction of the journal bearing having its reduced end 5 for supporting the collar 7 instead of supporting the collar upon the shaft I reduce to a minimum the friction which might oppose the free rotation of the shaft.

I claim:

1. In a centrifugal casting machine, a rotatable shaft, a flask carried by the shaft, an arm carried by the shaft, a contractile coil spring carried by the arm and means for locking the arm at times against movement relative the shaft.

2. In a centrifugal casting machine, a rotatable shaft, a bearing for the shaft, an arm carried by the shaft and rotatable therewith, means for locking said arm and shaft against rotation relative the bearing, a flask carried by said arm, a lever rotatably mounted relative the shaft, means for locking the lever against rotation at times relative the shaft and springs secured to the free end of said lever.

3. In a centrifugal casting machine, a bearing, a shaft rotatably mounted in the bearing, an arm carried by and rotatable with said shaft, means for locking the arm against movement at times relative the shaft, a flask carried by one end of said arm, a weight for counterbalancing the flask carried by the opposite end of the arm, a collar embracing the bearing, a lever carried by the collar, springs secured to the free end of said lever and means to lock said collar against movement at times relative the shaft.

4. In a centrifugal casting machine, a bearing, a flange having a slot carried by one end of the bearing, a shaft rotatably mounted within the bearing, a T-coupling secured to and rotatable with the shaft, a flange carried by the T-coupling, there being a slot in said flange, means carried by the T-coupling for engagement with both of said slots for locking the coupling against movement relative the bearing, an arm carried by the T-coupling, a flask carried by one end of said arm, a counterbalancing weight carried by the opposite end of the arm, a collar embracing the bearing, an arm carried by the collar, springs acting on said arm, a collar embracing the shaft and secured against movement relative the shaft and a pawl and ratchet connection between said collars.

5. In a centrifugal casting machine, a bearing, a flange having a slot carried by one end of the bearing, a shaft rotatably mounted within the bearing, a T-coupling secured to and rotatable with the shaft, a flange carried by the T-coupling, there being a slot in said flange, means carried by the T-coupling for engagement with both of said slots for locking the coupling against movement relative the bearing, an arm carried by the T-coupling, a flask carried by one end of said arm, a counterbalancing weight carried by the opposite end of the arm, a collar embracing the bearing, an arm carried by the collar, springs acting on said arm, a collar embracing the shaft and secured against movement relative the shaft, a pawl and ratchet connection between said collars, and a lever detachably secured to said first mentioned collar.

6. In a centrifugal casting machine, a bearing, a shaft rotatably mounted in the bearing, an arm carried by and rotatable with the shaft, a locking device to prevent movement of the arm and shaft relative the bearing at times, means for normally holding the locking device in an inoperative position, a flask carried by the arm, means for counterbalancing the weight of said flask, a collar loosely mounted on the bearing, an arm carried by the collar, a spring acting on said arm, a collar embracing the shaft and secured against movement thereon, a pawl and ratchet connection between said collars and means for holding the pawl normally in an inoperative position.

In testimony whereof, I have signed my name to this specification, in presence of two subscribing witnesses.

JAMES M. ALLEN.

Witnesses:
N. G. BUTLER,
E. L. WALLACE.